July 2, 1957  E. E. TANGARD  2,797,948
PRESSURE VESSEL AND CLOSURE
Filed June 28, 1954  5 Sheets-Sheet 1

INVENTOR
Einar E. Tangard
BY
C. F. Bryant
ATTORNEY

July 2, 1957  E. E. TANGARD  2,797,948
PRESSURE VESSEL AND CLOSURE
Filed June 28, 1954  5 Sheets-Sheet 2

INVENTOR
Einar E. Tangard
BY
ATTORNEY

July 2, 1957 E. E. TANGARD 2,797,948
PRESSURE VESSEL AND CLOSURE
Filed June 28, 1954 5 Sheets-Sheet 4

INVENTOR
Einar E. Tangard
BY
ATTORNEY

July 2, 1957  E. E. TANGARD  2,797,948
PRESSURE VESSEL AND CLOSURE
Filed June 28, 1954  5 Sheets-Sheet 5

INVENTOR
Einar E. Tangard
BY
ATTORNEY

United States Patent Office 2,797,948
Patented July 2, 1957

2,797,948

PRESSURE VESSEL AND CLOSURE

Einar E. Tangard, Scarsdale, N. Y., assignor to Combustion Engineering, Inc., New York, N. Y., a corporation of Delaware Application June 28, 1954, Serial No. 439,525

5 Claims. (Cl. 292—144)

This invention relates to pressure vessels provided with removable closures and particularly to vessels of large diameter subjected to very high internal pressures and having a relatively large closure or closures connected thereto in a fluid tight manner capable of withstanding these high internal pressures yet capable of being readily removed to permit access to the interior of the vessel.

In certain industrial processes large vessels are employed and are operated under very high internal pressures, as for example, 2000 pounds and higher per square inch. It is often required that access openings be provided in these vessels which permit the insertion and removal of very large equipment necessitating the diameter of these openings being approximately equal to the internal diameter of the vessel. With these very high internal pressures and large diameters it will be appreciated that a very large force is applied to the closures for the access openings rendering the problem of positively securing the closures within these openings in a fluid tight manner a difficult one.

It is an object of this invention to provide such a pressure vessel with a closure secured within an opening in the vessel in a relatively simple yet highly satisfactory manner which provides a fluid tight juncture between the vessel and the closure and which positively retains the closure properly seated within the opening against the force exerted by the high internal pressure yet which permits removal of the closure from the vessel easily and rapidly.

Other and further objects of the invention will become apparent to those skilled in the art as the description proceeds.

With the aforementioned objects in view, the invention comprises an arrangement, construction and combination of the elements of the inventive organization in such a manner as to attain the results desired as hereinafter more particularly set forth in the following detailed description of an illustrative embodiment, said embodiment being shown by the accompanying drawings wherein.

Figure 1:
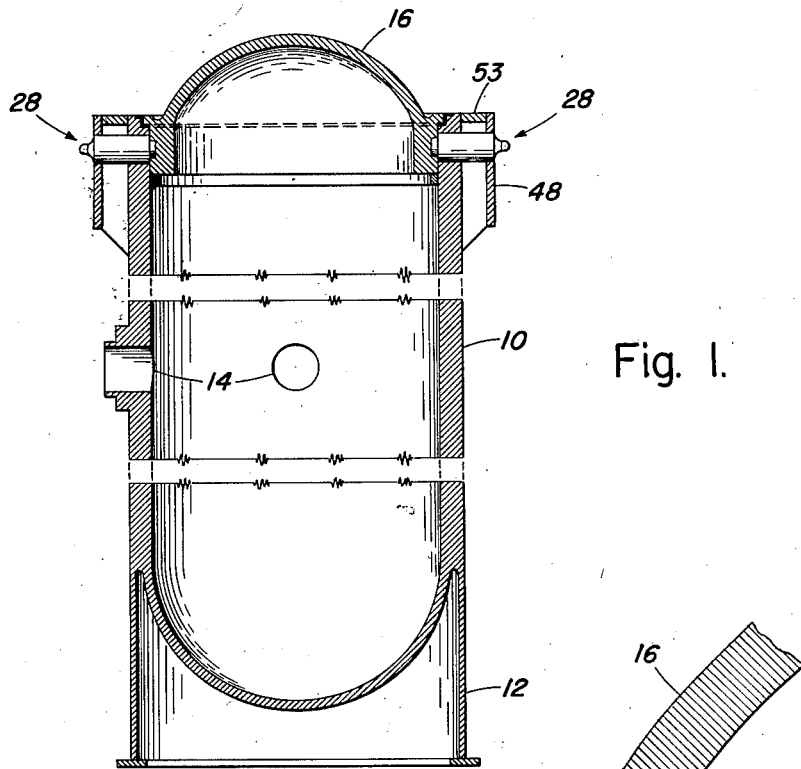
Figure 1 is a vertical sectional view of a pressure vessel embodying the present invention.
Figure 2:
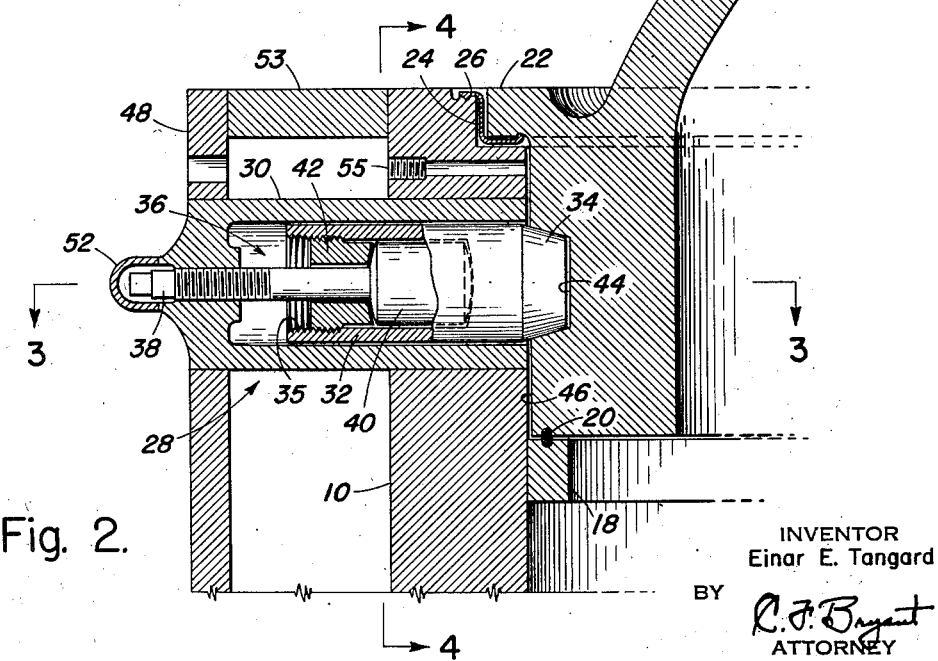
Figure 2 is a detailed section of the juncture of the closure and vessel and the mechanism for retaining the closure within the opening of the vessel.

Referring now to the drawings, wherein like reference characters are used throughout to identify like elements, the organization of Fig. 1 comprises a pressure vessel 10 which is of cylindrical configuration and is supported upon the downwardly depending skirt 12. This vessel is of large diameter and has its upper end open to permit the insertion and removal of large equipment. In the illustrative organization small openings 14 are disclosed as provided in the vertical wall of the vessel, the purpose of these openings being to permit the attachment of piping and/or insertion of various actuating mechanism into the vessel and for instrumentation of the vessel with these openings normally being sealed in a fluid tight manner. The upper end of the vessel is provided with a removable closure 16, which, when secured in place, effects a fluid tight juncture with the vessel preventing fluid leakage from the large opening in the upper end of the vessel. The closure 16 extends into the vessel in engagement with the annular gasket 20 which forms a portion of the inwardly extending seat 18 formed or attached to the interior wall of the vessel. Extending radially outward from the closure is flange 22 received within and in spaced relation to the walls of complementary relieved portion 24 formed in the end of the vessel with flexible metallic seal 26 interposed between the flange and the relieved portion as shown and having its inner edge welded to the lower end of flange 22 and its outer edge welded to the upper end of vessel 10.

In carrying out a particular process within vessel 10 the internal pressure of the vessel may exceed 2000 pounds per square inch and in order to retain closure 16 within the opening in the vessel against the very large force thus exerted against the closure and in order to force the closure downward into fluid tight engagement with gasket 20 suitable locking devices designated generally 28 are employed and positioned in closely spaced relation about the circumference of the vessel. Each of these locking devices comprises a hollow cylindrical housing 30 extending radially outward of the wall of the vessel and having its inner end secured to said wall in a fluid tight manner. Slidably received within housing 30 is cylindrical plunger 32 having its inner end tapered at 34 and its outer end provided with recess 35. Radial movement of plunger 32 within housing 30 is produced by actuator 36 which includes a stem or actuating rod 38 that extends radially outward of housing 30 and is threadedly received in a suitable opening provided in the outer end of the housing. The inner end of the actuator 36 has an enlarged cylindrical portion 40 received within recess 35 in a manner to permit limited universal movement between the plunger 32 and actuator 36, with the enlarged cylindrical portion 40 being retained in the inner end of recess 35 by washer or bushing 42 threadedly received in the outer end of the recess. By permitting this limited universal movement, binding of the actuator in the plunger is prevented. The outermost end of stem 38 is squared or otherwise suitably formed for the reception of a tool, such as a wrench, for effecting rotation of the stem whereby plunger 32 may be removed longitudinally of housing 30 and accordingly radially of the vessel.

Upon radial inward movement of plunger 32 the tapered inner end extends into and is received by recesses or relieved portions 44 formed in the peripheral surface 46 of closure 16 with these recesses or relieved portions having tapered walls complementary to the taper of the inner end of the plunger with these complementary tapered surfaces being in engagement throughout their circumferential length when the plunger is advanced to its radial innermost position thereby positively preventing relative axial movement between vessel 10 and closure 16. To insure this circumferential engagement of the tapered surfaces recess 44 has an axial dimension sufficiently great so that there is a space between the inner end of plunger 32 and the end wall of the recess when the plunger occupies its innermost position.

In order to insure that closure 16 is in fluid tight engagement with gasket 20 the relieved portions 44 are arranged relative to the plungers 32 so that as the plungers are advanced toward their radial inner position the tapered surfaces of the inner end of the plunger and of the relieved portions coact to force or cam the closure downward compressing gasket 20 between the inner end of closure 16 and the seat 18 with considerable force thereby insuring a fluid tight juncture.

Figure 3:
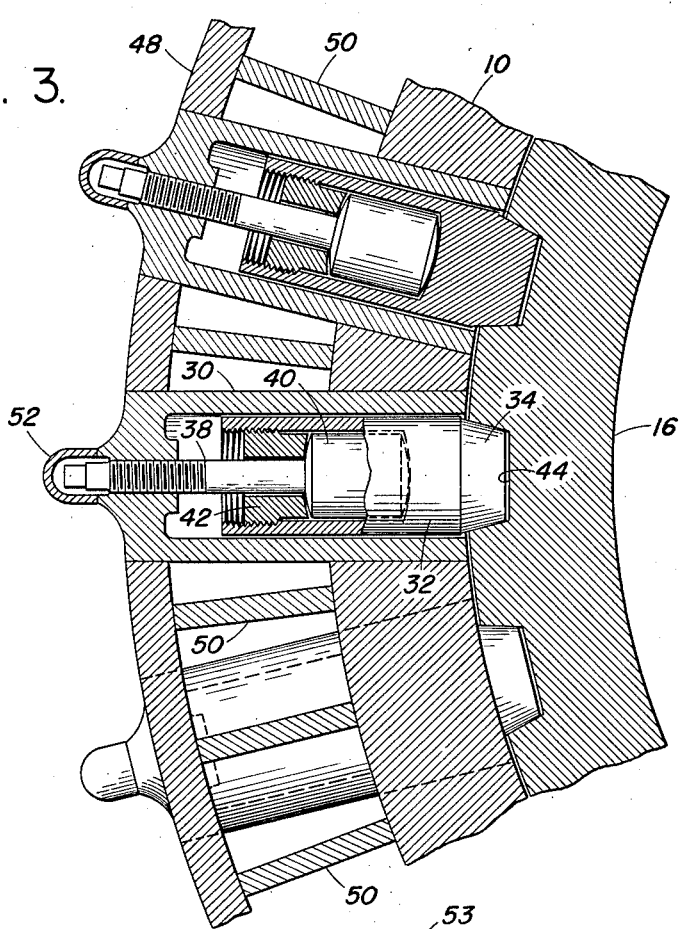
Figure 3 is a sectional view taken along line 3—3 of Fig. 2 and showing the disposition of the retaining mechanism about the circumference of the vessel.
Figure 4:
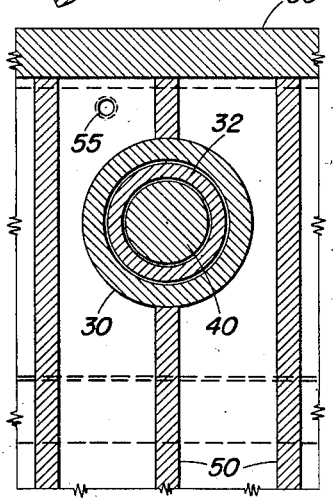
Figure 4 is a sectional view taken along line 4—4 of Fig. 2.

As is evident from Fig. 3 the locking devices 28 are circumferentially spaced about the vessel with the spacing between the adjacent locking devices being as small as structural strength requirements of the vessel wall will permit.

The upper end of the vessel wall is re-enforced and the radial outer ends of cylindrical housings 30 are supported by annular re-enforcing member 48 secured to the vessel wall by radial supports 50 with ring 53 bridging the space between the upper end of annular member 48 and vessel 10.

In operation of the organization of Figs. 1 through 4, after the desired mechanism has been inserted into the vessel through the open upper end, closure 16 with flexible metallic seal 26 welded thereto is then inserted into the open end in engagement with gasket 20 of seat 18. Prior to this insertion, however, all of the plungers 32 are moved to their radial outermost position where they are contained entirely within their cylindrical housing 30 and thereby do no obstruct the insertion of the closure into the vessel. After closure 16 has been thus inserted into the open end of the vessel the plungers 32 are advanced to their radial innermost position, by rotating stems 38, during which advancement closure 16 is forced downward upon gasket 20 by the camming action of the engaging surfaces of the end 34 and relieved portion 44. The flexible metallic seal 26 is then welded to the upper end of the vessel wall and seal caps 52 are welded to the outer end of housing 30 insuring against fluid leakage around stem 38. When it is desired to remove the closure from the end of vessel 10, these last mentioned welds are broken and caps 52 removed permitting access to the squared outer end of stems 38. These stems are then threaded radially outwardly, withdrawing plungers 32 from their innermost position and moving them to their outermost position where they are contained entirely within housing 30. Thereafter closure 16 is easily removed from the upper end of the vessel.

The flexible metallic seal 26 and seal caps 52 are only auxiliary or secondary seals and are effective only in the event gasket 20 leaks. Should gasket 20, for any reason leak, however, detection of the leakage is had through suitable mechanism, not disclosed, connected to the monitoring passage 55 with this detecting device also being effective to act as a pressure regulator bleeding what may be a lethal fluid into a remote safe location and insuring that the pressure in the annular space between the peripheral surface 46 of closure 16 and the inner wall of the vessel does not exceed a predetermined value which is lower than the pressure within vessel 10 so that the auxiliary seals 26 and 52 do not have to withstand the full pressure within the vessel. For safety purposes, however, it may be well to construct these seals to withstand the full pressure within the vessel. It will be noted that seal member 26 conforms to the configuration of the surface of flange 22 so that when pressure is applied to this seal through failure of gasket 20 it will be forced against this surface thereby relieving the gasket of most of the force that it would otherwise have to withstand.

Figure 6:
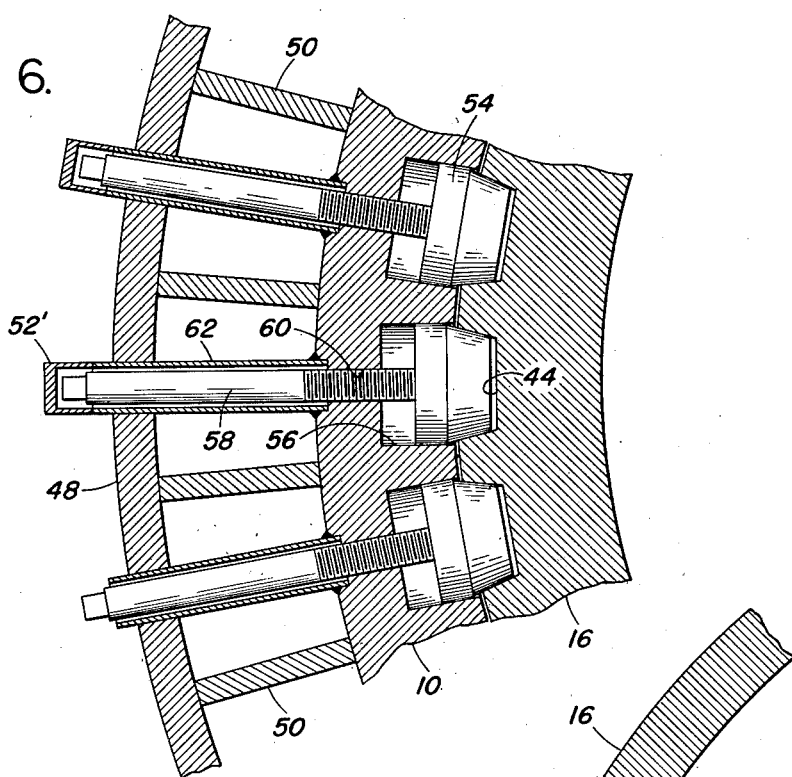
Figure 6 is a sectional view taken along line 6—6 of Fig. 5 and showing the circumferential disposition of this modified form of mechanism about the vessel.
Figure 5:
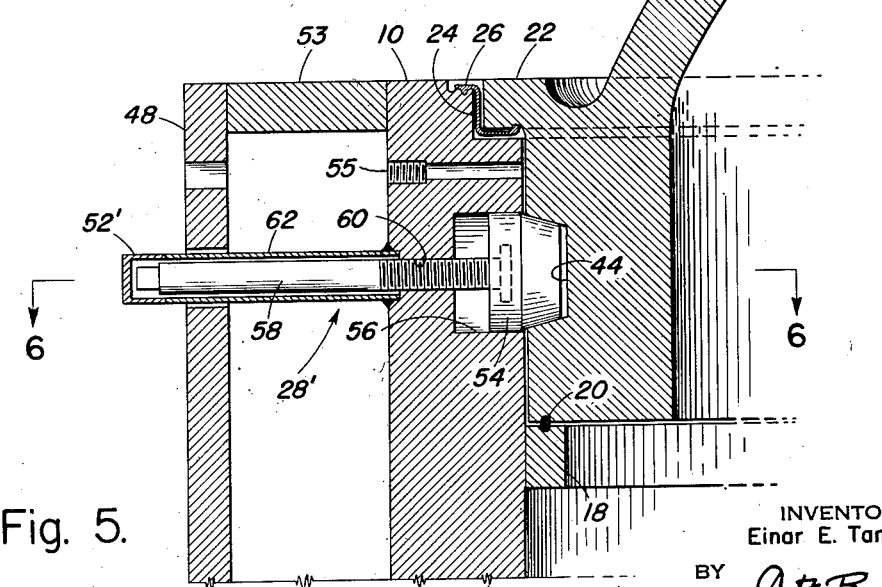
Figure 5 is a view similar to that of Fig. 2 but showing a modified form of mechanism for retaining the closure within the opening in the vessel.
Figure 8:
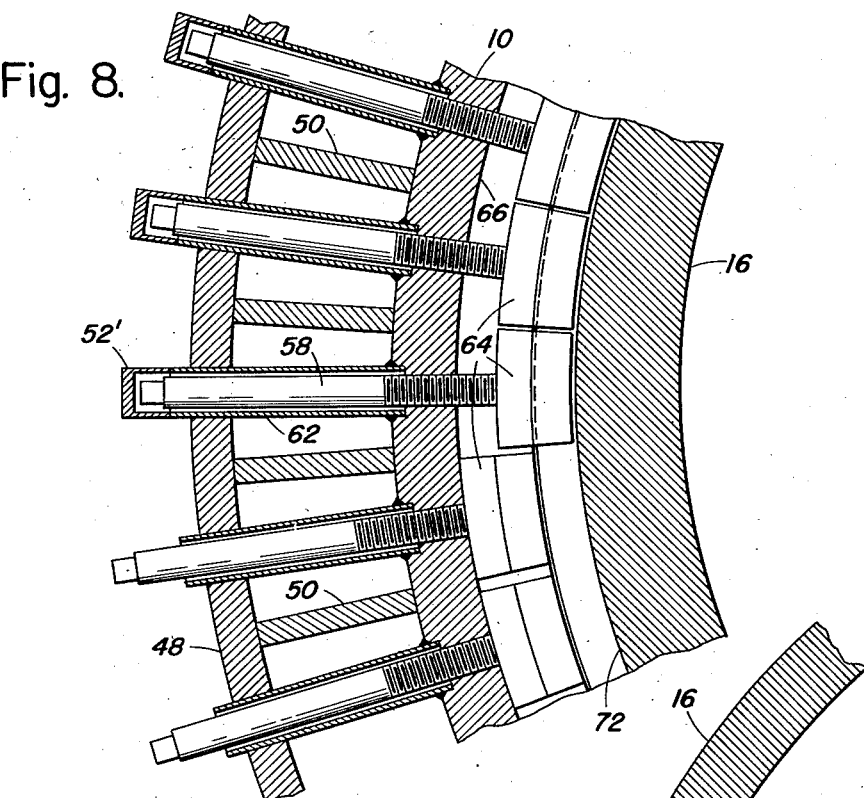
Figure 8 is a sectional view taken along line 8—8 of Fig. 7 and showing the circumferential disposition of this further modified form of mechanism about the vessel.
Figure 7:
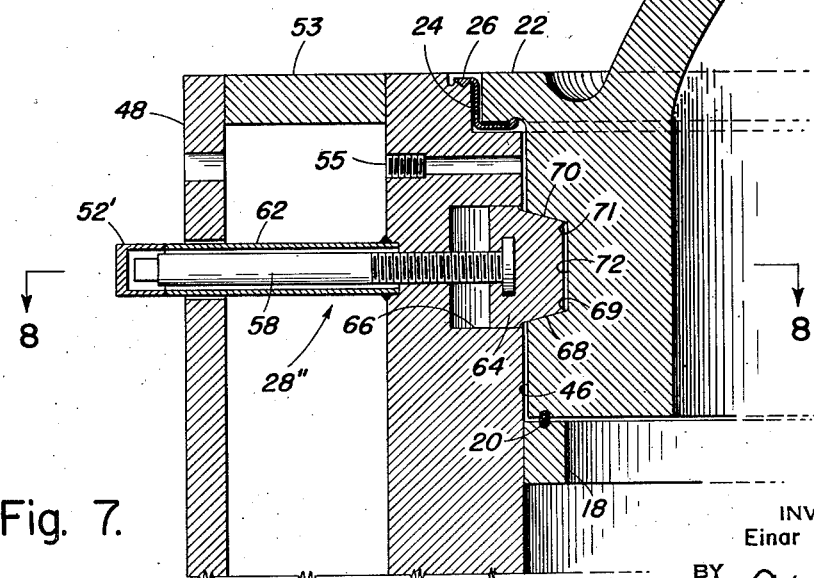
Figure 7 is a view similar to that of Fig. 2 but showing a further modified form of mechanism for retaining the closure within the vessel opening.

The embodiments of Figs. 5 and 6 and of Figs. 7 and 8 are somewht similar to the embodiment of Figs. 1 through 4 hereinbefore described except that in the previously described embodiment the length of the plunger is considerably greater than the wall thickness of the vessel which provides for structural rigidity eliminating the possibility of the plunger tilting within the cylindrical housing and enabling greater forces to be applied to the closure.

In the embodiment of Figs. 5 and 6 locking devices 28' include cylindrical plunger 54 slidably received in cylindrical opening or bore 56 provided in the inner surface of the vessel. Extending radially outward from plunger 54 through the vessel wall and in threaded relation with opening 60 in the wall is actuating stem 58. The radial outer end of stem 58 is surrounded by sleeve 62 which has its inner end welded to the outer surface of the vessel wall and is provided at its outer end with removable cap 52' effective to prevent fluid leakage around the stem 58 in the event that gasket 20 should leak. The inner end of plunger 54 is tapered in the same manner as the previously described plunger 32 and the operation of this embodiment is the same as that of the previously described embodiment of Figs. 1 through 4.

In the embodiment of Figs. 7 and 8 the locking devices 28" comprise plungers 64 of rectangular transverse section slidably received in the annular recess 66 provided in the inner surface of the vessel wall. Each of the plungers is provided with downwardly tapering surfaces 68 and 70 at its inner end with the inner end of the plungers being received upon advancement to their innermost radial position within annular recess 72 provided in the peripheral surface 46 of closure 16. The recess 72 has tapered surfaces 69 and 71 complementary to surfaces 68 and 70 with these complementary surfaces being in engagement when plunger 64 is in its innermost position. Plunger 64 is actuated by stem 58 in the same manner as the previously described embodiments with the inner end of the stem being journaled to plunger 64 in a manner permitting relative rotative movement between the two but preventing relative axial movement. Annular recess 72 is so related to plunger 64 that upon radial inward movement of the plunger closure 16 is forced or cammed downward into engagement with gasket 20 as hereinbefore described.

Figure 9:
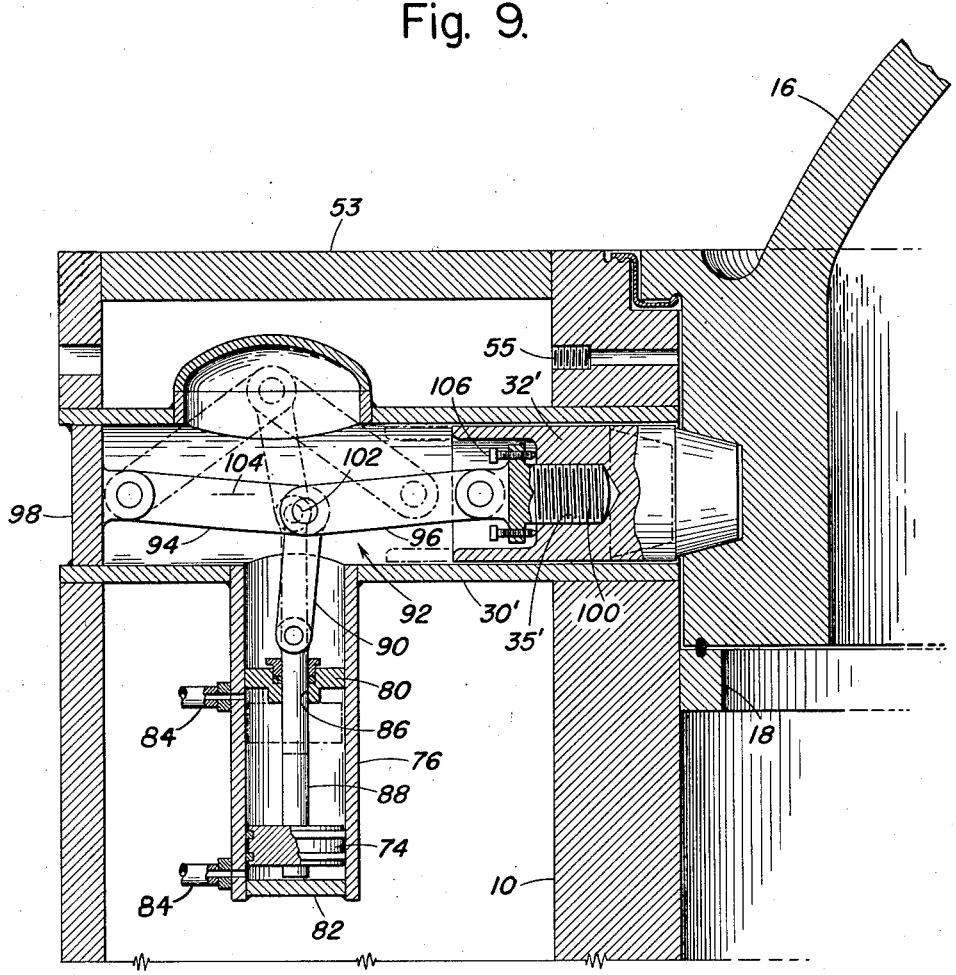
Figure 9 is a sectional view of a modified form of actuator for the mechanism of Figs. 1 through 4 for retaining the closure within the opening of the vessel.

In lieu of the screw threaded actutator disclosed as associated with the embodiment of Figs. 1–4 the fluid pressure actuator of Fig. 9 may be preferred since, although it is more complicated it permits more rapid release of the closure locking mechanism and removal of the closure. This fluid pressure actuator includes piston 74 slidably mounted in cylinder 76 which opens into and extends downwardly from cylindrical housing 30'. The piston 74 is moved vertically intermediate plugs 80 and 82 by means of fluid pressure supplied and exhausted through conduits 84 with suitable valve mechanism being associated with these conduits and operative so that when one conduit is acting as a pressure supply the other is acting as an exhaust. Extending upwardly from piston 74 through opening 86 in plug 80 is piston rod 88 having link 90 of linkage 92 pivotally connected to its upper end. The linkage 92 also includes links 94 and 96 with link 94 being pivotally connected to plug 98 welded into the outer end of housing 30' and link 96 being pivotally connected to connector 100 threaded into recess 35' in plug 32'. The three links of linkage 92 are pivotally connected together at 102 with this pivotal connection moving intermediate its uppermost position indicated in dotted lines in Fig. 9 and its lowermost position indicated in full lines by means of piston 74. In the uppermost position of the linkage plunger 32' is in its retracted position permitting withdrawing of closure 16 while in the lowermost position of the linkage the plunger is in its advanced position with its tapered inner end snugly fitted within the tapered recess 44 formed in the closure thereby preventing removal of the closure from within the vessel.

When linkage 92 is in its lowermost position connection 102 lies just below the dead center line 104 of the linkage so that any radial outward force produced by plunger 32' will tend to force this connection downward and not upward with downward movement being prevented by piston rod 88 which will be in engagement with plug 82.

With this fluid pressure actuated mechanism it will be necessary to initially adjust the radial position of plunger 32' so that when linkage 92 is in its lowermost position the inner end of the plunger will be properly seated in recess 44. This adjustment is effected by the threaded connection between connector 100 and plunger 32', rotation of plunger 32' relative to connector 100 causing the plunger to be adjusted radially inward or outward depending upon the direction of the rotation. By means of this adjustment compensation for wear can also be had.

After the plunger is properly adjusted set-screws 106 provided in the flange of connector 100 are tightened so as to thereafter prevent relative rotation between the connector and the plunger.

With this fluid pressure operated actuating mechanism all of the locking devices may be operated at the same time since a single valve may control the supply and exhaust of pressure through conduits 84 thereby greatly decreasing the time required for manipulation of closure 16.

With the organization of the present invention it will be apparent that a relatively simple yet highly effective structural arrangement is provided whereby a large closure is retained within an opening of a pressure vessel in a fluid tight manner in opposition to a relatively large force created by the high internal pressure in the vessel and yet when desired this closure may readily be removed from said opening.

While in the illustrative organization disclosed, the closure is provided on the upper end of the vessel, the vessel may equally well be arranged with the closure on the bottom or on both the top and bottom and the vessel may be spherical rather than cylindrical as disclosed.

While I have illustrated and described a preferred embodiment of my novel organization it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What I claim is:

1. In combination, a cylindrical pressure vessel having an open end and provided with a seat formed on its inner surface, a closure for said open end in engagement with said seat and having a portion extending into said end with its peripheral surface juxtaposed to the inner surface of the vessel, means effective to force the closure upon said seat in a fluid tight manner, to retain the closure in its closed position and accurately locate the closure within the opening, said means including numerous hollow cylindrical housings extending through and secured within radial bores provided in the vessel wall at a location inwardly of the end of said open end and radially opposite the portion of the closure extending into said end with said bores lying in a common plane and disposed in spaced relation about the vessel, said housing being of an axial dimension greater than the thickness of the wall and having an open inner end, a cylindrical locking member snugly but slidably disposed within each of said housings, said locking member also having an axial dimension greater than the thickness of the vessel wall and having its inner end tapered, means operative to radially move said locking members within said housings to and from a retracted position where the closure is freely removable from within the vessel and an advanced position where said closure is positively retained within the vessel, the peripheral surface of the portion of the closure extending into the vessel being provided with bores to receive the inner ends of said locking members with said bores being tapered complementally to the inner ends of the locking members with said tapered surfaces being in engagement when said locking members are moved to their advanced position so as to move the closure into fluid tight engagement with said seat, to prevent relative axial movement between said closure and vessel and accurately locate the closure within the open end of the vessel.

2. A cylindrical pressure vessel having an open end and provided with an annular seat formed on its inner surface and disposed inwardly of said end, a closure disposed within said open end in engagement with said seat, the vessel wall having numerous bores extending radially therethrough at a location outwardly of the seat with the inner ends of said bores being counterbored and with said bores being uniformly spaced circumferentially of the vessel, a cylindrical member snugly but slidably disposed in each of said counterbores with the inner end of said member being tapered, a threaded actuator connected to said member and extending through said bore in threaded relation therewith and operative to move said member from a retracted position wherein said closure is freely removable from the end of the vessel to an advanced position, the peripheral surface of said closure being provided with bores for reception of the inner end of said members when moved to their advanced position with said last mentioned bores being tapered complementally to the inner ends of said cylindrical members with said tapered surfaces being in engagement when said cylindrical members are moved to their advanced position thereby preventing axial movement of the closure relative to the vessel when said members are so disposed and accurately locate the closure within the opening, said members and said relieved portions being so related that as said members are moved toward their advanced position the closure is moved into fluid tight engagement with said seat.

3. A cylindrical pressure vessel having an open end and provided with an annular seat formed on its inner surface and disposed inwardly of said end, a closure disposed within said open end in engagement with said seat numerous members radially disposed with respect to said vessel and closely spaced circumferentially thereabout at a location intermediate said seat and the end of the vessel, said members being operative to positively retain said closure within said vessel and force the same upon said seat, each of said members including a hollow cylindrical housing radially disposed with respect to the vessel and secured within a bore provided in the vessel wall with the inner end of said housing being open and the outer end provided with an axially disposed reduced threaded bore, said cylindrical housing having an axial dimension substantially greater than the thickness of the wall, a cylindrical locking member snugly but slidably disposed within said housing, said member also having an axial dimension substantially greater than the thickness of the wall and having its inner end tapered and its outer end recessed, an actuator for said locking member having a head end disposed within said recess and a stem extending outwardly from said head end and through said threaded bore in threaded relationship therewith, a retaining washer threaded into said recess operative to retain said head therewithin, said actuator being effective to move said locking member from a retracted position where the closure is freely removable from within the vessel to an advanced position where said closure is positively retained within said vessel, the peripheral surface of said closure being provided with bores for reception of the inner end of said members when moved to their advanced position, said bores being tapered complementary to the inner end of said members with these complementary tapered surfaces being in engagement when said members occupy their advanced position thereby preventing axial movement of the closure relative to the vessel when said members are so disposed and accurately locating the closure within the open end, said members and said relieved portions being so related that as said members are moved toward their advanced position the closure is moved into fluid tight engagement with said seat.

4. A pressure vessel provided with an opening bounded by a wall disposed generally axially thereof and provided with an annular seat means, a closure positioned within said opening in engagement with said seat means, numerous hollow cylindrical housings extending through said wall in fluid tight engagement therewith and with their inner ends open, said housings being uniformly spaced about said opening, each of said housings having a cylindrical locking plunger slidably disposed therein and movable to and from a retracted position where they permit free removal of the closure from within said opening and an advanced position where they prevent such removal, said closure having bores for receiving the inner end of said plungers when in said advanced position with said bores being tapered complementally with said inner ends and with said tapered surfaces being in engagement when said plungers are moved to their advanced position, said bores and said plungers being disposed so as to force the closure upon said seat in a fluid tight manner upon radial inward movement of said plunger means, fluid pressure operated means for effecting said movement of said plunger including a fluid motor movable normal to the direction of said movement of the locking plungers and a linkage means operated by said motor and connected to said plunger, said linkage means being constructed and arranged to have a dead center position located intermediate the positions occupied by said linkage when said plunger is in its advanced and retracted position.

5. In combination, a pressure vessel having an opening therein, an annular seat means associated with said opening, a removable closure for said opening and adapted to coact with said annular seat means to tightly engage the same and thereby occupy a closed position with respect to said opening with at least a portion of said closure extending into said opening and with the peripheral surface of this portion being juxtaposed to the inner surface of said opening when said closure is in its closed position, said seat means being effective to limit the insertion of the closure within the opening, means for positively retaining the closure within the opening and accurately locating the same therewithin comprising a plurality of cylindrical plugs disposed about said peripheral surface in spaced relation with each other and with their axes radially of the axis of said opening, said plugs being associated with the vessel wall in a manner to prevent movement thereof in all but an axial direction, means for axially reciprocating said plugs to and from a retracted position where they permit unobstructed removal of the closure from the opening and an advanced position where the inner ends of said plugs are disposed in radial bores in said peripheral surface, said cooperating inner end and bores being complementally tapered with the surfaces of these tapers being in engagement when said plugs are moved to their advanced position thereby preventing removal of the closure from the opening and accurately locating said closure within the opening, said plugs and bores being so disposed that as the plugs are moved to their advanced position the closure is moved into fluid tight engagement with said seat means.

References Cited in the file of this patent

UNITED STATES PATENTS

| | | |
|---|---|---|
| 1,874,833 | Taylor | Aug. 30, 1932 |
| 1,902,494 | Emmet | Mar. 21, 1933 |
| 2,196,895 | Bowman | Apr. 9, 1940 |
| 2,298,511 | Rathbun | Oct. 13, 1942 |
| 2,611,506 | Scheer | Sept. 23, 1952 |